(12) United States Patent
Jarvinen et al.

(10) Patent No.: US 6,470,711 B1
(45) Date of Patent: Oct. 29, 2002

(54) FURNACE FOR HEAT TREATMENTS OF GLASS SHEETS

(76) Inventors: Jouko Jarvinen, Sudenkato, 31 A, 33530 Tampere (FI); Guglielmo Macrelli, Via Nicola Ghetti, 1, 47037 Rimini (IT)

( * ) Notice: Subject to any disclaimer, the term of this patent is extended or adjusted under 35 U.S.C. 154(b) by 0 days.

(21) Appl. No.: 09/214,242
(22) PCT Filed: Jun. 30, 1997
(86) PCT No.: PCT/EP97/03407
§ 371 (c)(1), (2), (4) Date: Mar. 8, 1999
(87) PCT Pub. No.: WO98/01398
PCT Pub. Date: Jan. 15, 1998

(30) Foreign Application Priority Data

Jul. 5, 1996 (IT) .......................................... PD96A0176

(51) Int. Cl.⁷ .......................... C03B 25/04; C03B 29/04; C03B 27/00
(52) U.S. Cl. ............................. 65/273; 65/274; 65/29.1; 65/114; 65/29.19; 65/111; 65/163; 65/162; 65/160; 65/349; 65/350; 65/356; 65/DIG. 4; 219/470
(58) Field of Search ...................... 65/29.1, 114, 29.19, 65/111, 273, 274, 163, 162, 160, 349, 350, 356, DIG. 4; 219/470, 388

(56) References Cited

U.S. PATENT DOCUMENTS

| | | | |
|---|---|---|---|
| 3,402,038 A | * | 9/1968 | Hordis |
| 3,809,544 A | * | 5/1974 | Bowman |
| 4,336,442 A | | 6/1982 | Starr |
| 4,515,622 A | * | 5/1985 | McMaster et al. |
| 5,069,380 A | * | 12/1991 | Deambrosio |
| 5,154,338 A | * | 10/1992 | Okuno et al. |
| 5,647,882 A | * | 7/1997 | Thiessen |
| 5,672,191 A | * | 9/1997 | Kormanyos |
| 5,814,789 A | * | 9/1998 | O'Leary et al. ............. 219/388 |
| 6,050,814 A | * | 4/2000 | Lewandowski ............... 65/273 |
| 6,064,040 A | * | 5/2000 | Muller et al. .................. 65/114 |
| 6,067,820 A | * | 5/2000 | Silander et al. ................ 65/114 |

FOREIGN PATENT DOCUMENTS

| | | |
|---|---|---|
| DE | A1471831 | 3/1970 |
| EP | A024361 | 12/1987 |
| EP | A0376509 | 7/1990 |
| EP | A0443947 | 8/1991 |
| EP | A0592862 | 4/1994 |
| GB | A2083456 | 3/1982 |

* cited by examiner

Primary Examiner—Michael Colaianni
(74) Attorney, Agent, or Firm—Notaro & Michalos P.C.

(57) ABSTRACT

A furnace particularly for heat treatments of glass sheets, comprising a longitudinally-elongated chamber which contains roller conveyor elements for the glass sheets. The furnace comprises irradiation-heating elements combined with first and second elements for heating by forced air convection in which the air temperature is controlled by adjusting its circulation rate, the elements being located respectively above and below the conveyor elements and therefore above and below the sheets being treated.

10 Claims, 3 Drawing Sheets

FURNACE FOR HEAT TREATMENTS OF GLASS SHEETS

TECHNICAL FIELD

The present invention relates to a furnace particularly for heat treatments of glass sheets.

BACKGROUND ART

It is known that a wide variety of glass sheets is currently commercially available, the mechanical characteristics whereof are often strongly dependent on heat treatments performed after producing said sheets.

In particular, one of the most important heat treatments applied to glass sheets is heat tempering.

Heat tempering facilities currently include a furnace constituted by a longitudinally-elongated chamber in which a roller conveyor conveys the glass sheets, which are heated to a temperature which is, by way of indication, between 620 and 700° C.

Two methods are currently used to heat said sheets: heat transmission by irradiation or heat transmission by convection.

Furnaces are currently commercially available which use one or the other of these heating methods.

However, there are also more advanced and complex furnaces which use both methods but do so alternately.

The means for irradiation heat transmission are currently substantially constituted by electrical resistors of the rod type with a ceramic core, by coiled electrical resistors which are suspended or contained in channels formed in the refractory material of the furnace, by electrical resistors of the panel type, or radiating panels supplied by gas-fired burners.

In furnaces that use heat transmission by forced convection, the air inside the chamber is instead channeled and recirculated by means of fans towards nozzles which project it onto the glass sheet surfaces.

The air can be heated by the electrical resistors located in front of the fans or by gas-fired burners, which heat it inside channeling ducts.

Although they are widely used, the above-described systems all have a common drawback, i.e., they are unable to uniformly heat the two opposite surfaces of the sheet being processed in order to avoid distortions thereof caused by temperature differences due indeed to the different heating conditions.

More specifically, the different heating conditions of the two surfaces arise from the different values of the overall heat transmission coefficients between said surfaces and the furnace environment.

These different boundary conditions in fact cause, in the transient thermal condition, an asymmetrical temperature distribution along the glass sheet cross-section.

The more conspicuous unevennesses furthermore occur when the glass sheet at room temperature (by way of indication, at 20° C.) makes contact, inside the furnace, with the ceramic rollers, which are at a temperature of approximately 700° C.

The heat transmission coefficient due to the roller contact heat resistance is much greater than the transmission coefficient due to the irradiation on the upper side of the sheet. This entails a much greater temperature increase on the lower surface than on the upper surface.

Merely by way of indication, for glass temperature values below the limits at which relaxation effects occur (550° C.), the temperature difference on the two surfaces entails a greater expansion of the lower surface, with a consequent warping of the sheet, which thus tends to become concave and touch the conveyor rollers only in the central part.

This highly negative effect produces, on the sheet surface, abrasions of different depths and conspicuousness which can cause the end product to be unacceptable.

This effect is also even more evident in the case of glass sheets coated on one surface with a low-emissivity coating.

Low-emissivity coatings in fact have the purpose of reducing heat transmission through the glass sheet.

Said sheets are thus coated in order to reflect infrared heat radiation (wavelengths between 2 and 20 micrometers), leading to a reduction in what is known as emissivity of the sheet surface.

In this manner, it is possible to obtain thermally insulating glass sheets with heat transmittance rates comparable with those of opaque portions.

When it is necessary to temper these sheets, the above-mentioned problem of heating the treated surfaces becomes even more significant, since it is not convenient to arrange the coated surface downwards, since it would make contact with the rollers and would deteriorate due to abrasion; however, if the coated surface is arranged upwards, the irradiation from the arch of the furnace is reflected and accordingly an undesirable unevenness in heating occurs which further increases the problem of roller contact.

U.S. Pat. No. 4,336,442 discloses a roller hearth furnace for heating glass sheets which includes a plurality of conveyor rollers arranged inside the furnace chamber for conveying glass sheets from an entrance to an exit of the chamber. Arranged above and below the conveyor rollers inside the furnace chamber are a plurality of combination radiation and convection heaters formed by electrically heated serpentine pipe structures inside of which air is fed from outside the furnace, which air is subsequently heated by the pipe structures and through nozzles provided on the pipe structures directed for providing blasts of hot convection currents to the glass sheets.

DISCLOSURE OF THE INVENTION

The aim of the present invention is to solve the above drawbacks of conventional commercially available furnaces, in particular by achieving high temperature uniformity on both surfaces of the glass sheet being treated, both when treating normal glass sheets and when treating sheets with surfaces coated with low-emissivity coatings.

Within the scope of this aim, an object of the present invention is to improve the quality of the product after treatment, avoiding the onset of heat-related stresses and the formation of surface abrasions.

Another object of the present invention is to provide a furnace in which it is possible to control and adjust the heating conditions of the sheets being treated.

Another object of the present invention is to provide a furnace which is particularly flexible from the operating point of view according to the type of sheet to be treated.

Another object of the present invention is to provide a furnace which has the advantages of convection furnaces and those of irradiation furnaces but does not have the corresponding drawbacks.

In accordance with the invention, there is provided a furnace particularly for heat treatments of glass sheets as defined in the appended claims.

BRIEF DESCRIPTION OF THE DRAWINGS

Further characteristics and advantages of the present invention will become apparent from the following detailed description of an embodiment thereof, illustrated only by way of non-limitative example in the accompanying drawings, wherein.

WAYS OF CARRYING OUT THE INVENTION

Figure 1:
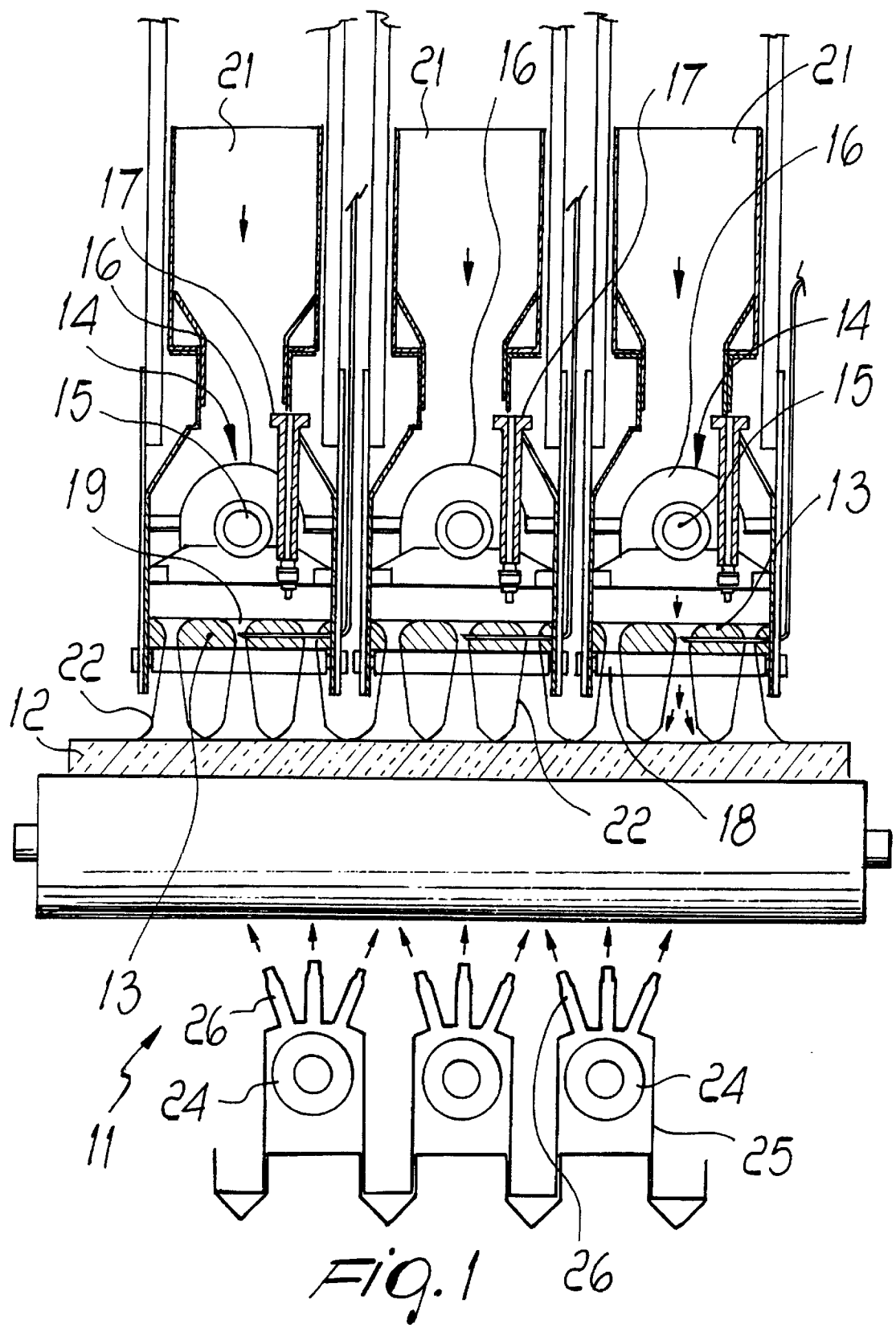
FIG. 1 is an orthographic projection view of part of a furnace according to the invention.
Figure 2:
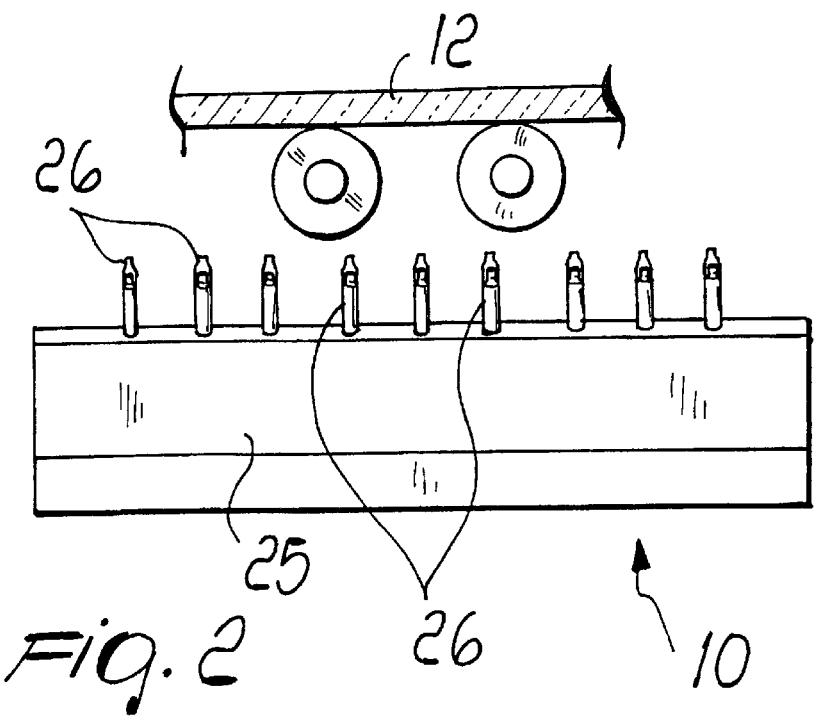
FIG. 2 is an orthographic projection view of a detail of the furnace of FIG. 1.
Figure 3:
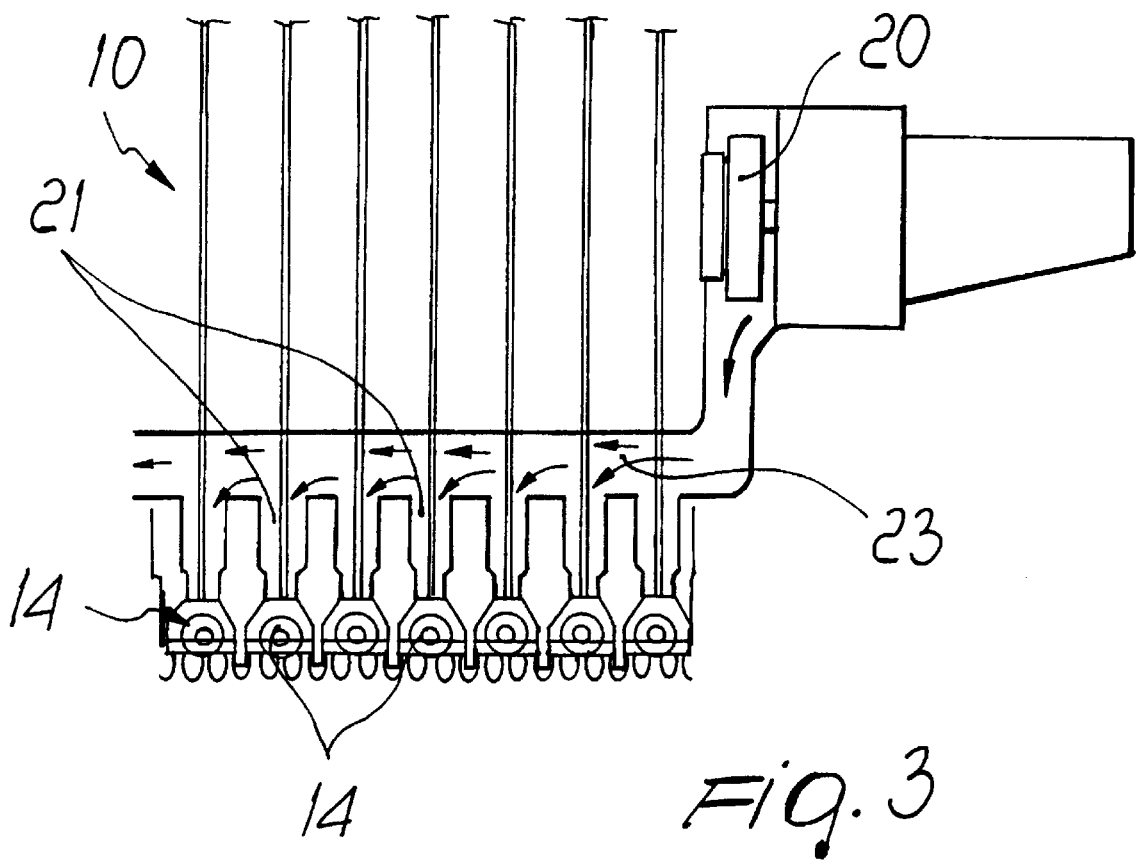
FIG. 3 is an orthographic projection view of another detail of the furnace of FIG. 1.

With particular reference to FIGS. 1 to 3, a furnace for heat treatments of glass sheets, according to the invention, is generally designated by the reference numeral 10.

The furnace 10 comprises a longitudinally-elongated chamber, not shown, which contains roller conveyor means, generally designated by the reference numeral 11, for the glass sheets; only one of said glass sheets is shown in the figures and is designated by the reference numeral 12.

The furnace 10 comprises irradiation-heating means combined with first and second means for heating by forced convection of air whose temperature is controlled by adjusting its circulation rate; said means are described hereinafter.

More specifically, the furnace 10 in fact comprises, above the roller conveyor means 11 and therefore above the glass sheet 12, a combination of the irradiation-heating means and of the first convection-heating means.

There is a plurality of radiating panels 13 made of refractory steel which are arranged side by side and longitudinally along the advancement direction of the glass sheets; a heating unit, generally designated by the reference numeral 14, is associated with each radiating panel and is arranged above it; each heating unit is constituted by a radiating electric resistor 15 which has a curved reflecting panel 16 arranged in an upward region.

The figures also show, for each one of the electric resistors 15, the insulated electrical connections, designated by the reference numeral 17.

Each one of the radiating panels 13 is provided with holes 18 for the passage of hot air, which strikes the upper surface of the glass sheets 12 being treated when exiting from said holes.

In particular, each one of the holes 18 is shaped so as to have a flared portion 19 directed towards the corresponding heating unit 14.

More specifically, the hot air that exits from the holes 18 is drawn from inside the chamber of the furnace 10 by fan means, designated by the reference numeral 20, and is then pushed through ducts 21 towards the electric resistors 15 and, once it has struck said resistors, towards the radiating panels 13, from which it exits through the holes 18.

In FIG. 1, the reference numeral 22 designates the profiles of the air jets at the exit of the holes 18.

Figure 4:
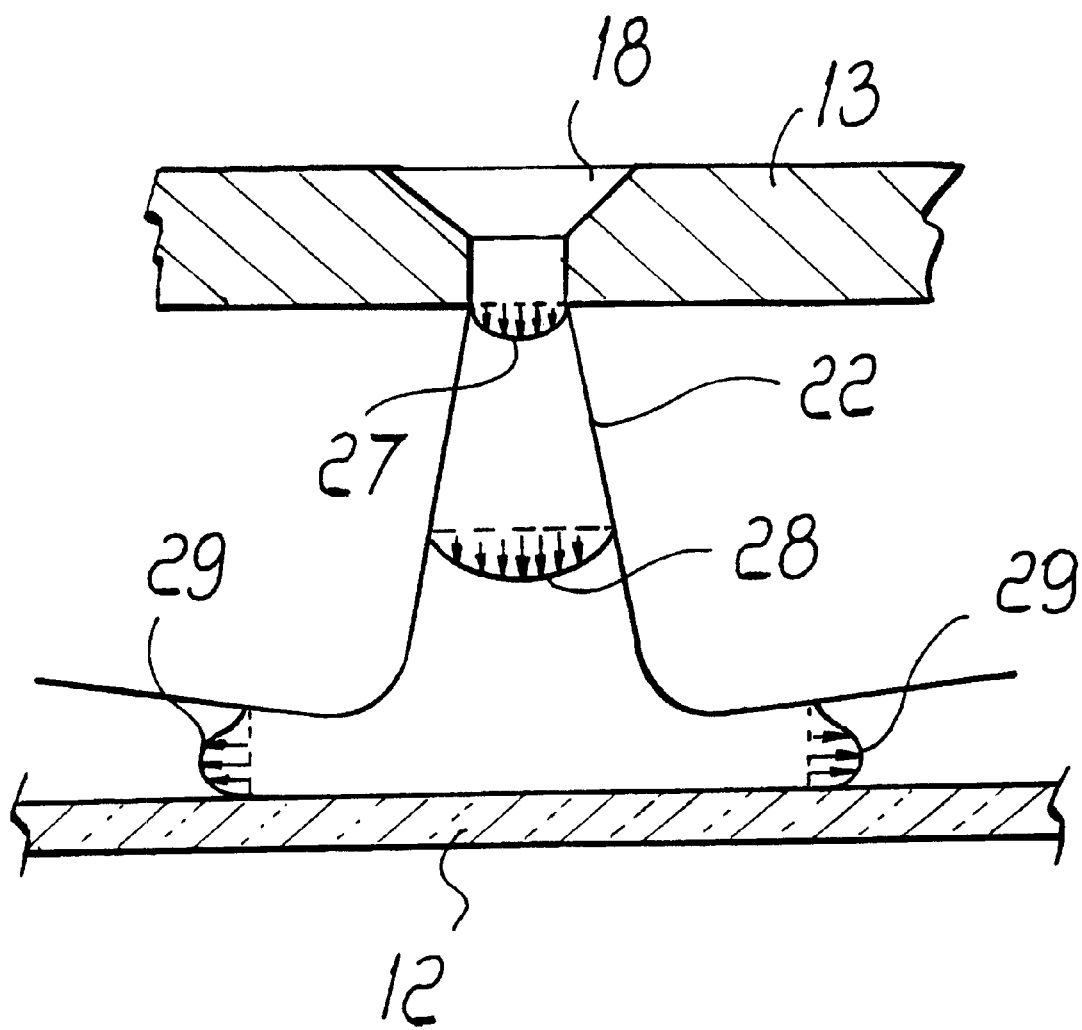
FIG. 4 is an enlarged-scale sectional view of a detail of one of the holes for blowing air above the sheets being treated, showing the speed profiles of the corresponding air jet.

The particular configuration of the holes 18 allows to give the air particular speed profiles (designated by the reference numerals 27, 28 and 29 in FIG. 4), which studies conducted by mathematical simulation have shown to be particularly effective for temperature uniformity, particularly in the first heating periods, which are the most critical.

The speed of the air that exits from the holes 18 can be adjusted by regulating its flow-rate by means of an electronic control of the speed of said fan means 20, which feed said air into a distribution duct 23 connected to the ducts 21.

The second convection-heating means comprise, below each one of the roller conveyor means 11 and therefore below the glass sheet 12, a plurality of heating elements of the electric-resistor type, designated by the reference numeral 24, which are arranged longitudinally to the advancement direction of said sheets.

Each one of said heating elements 24 is contained in a corresponding box-like body 25, from which nozzles 26 protrude; said nozzles are meant to distribute, in the region below the glass sheet 12, the hot air drawn by fan means (not shown in the figures) from the chamber of the furnace 10.

The arrangement of some nozzles is such as to force the air to directly strike the lower surface of the glass sheet 12, whilst other nozzles force the air to directly strike a corresponding roller of the conveyor means 11.

The temperature of the air that exits from the nozzles 26 is such that by striking both the glass sheet 12 and the rollers of the conveyor means 11 it heats the glass sheet and cools the rollers, significantly contributing to even out the temperatures and the overall heat exchange coefficients, also in relation to those of the upper face of the glass sheet 12.

In practice, it has been observed that the present invention has achieved the intended aim and objects.

In particular, it should be noted that the furnace according to the invention, by appropriately combining irradiation heating and forced-convection heating with temperature adjustment allowed by adjusting the air circulation rate, controls the balance of the heating conditions on the surfaces of the sheet being treated.

Accordingly, with the furnace according to the invention it is possible to achieve a satisfactory distribution of the temperatures on the glass sheet, substantially eliminating entirely both sheet warping and abrasion of the surfaces of said sheet.

It is also noted that the furnace according to the invention provides these uniformities in a substantially simple and flexible manner.

The possibility to adjust the temperature by adjusting the air flow rate causes the furnace according to the invention to be adaptable to the treatment of even substantially different glass types.

In particular, the furnace according to the invention substantially completely solves the severe drawbacks caused by the treatment of glass sheets with low-emissivity coatings.

The present invention is susceptible of numerous modifications and variations, all of which are within the scope of the inventive concept; likewise, the details may be replaced with other technically equivalent elements.

The materials and the dimensions may be any according to requirements.

What is claimed is:

1. A furnace for heat treatment of glass sheets, comprising:

a chamber containing a plurality of conveyor rollers, the conveyor rollers supporting a glass sheet being treated for advancement along an advancement direction, said glass sheet having a first surface and an opposite second surface, the second surface being supported in direct, heat transmission contact on said plurality of conveyor rollers;

combined irradiation and first convection heating means arranged in said chamber above said glass sheet supported on said plurality of conveyor rollers and comprising radiating panels arranged side by side along said glass sheet advancement direction, the radiating panels being provided with passage holes, overlying heating units, and fan means for conveying air heated by said heating units to said passage holes, with each one of said panels being brought to a preset temperature by a corresponding one of said overlying heating units, said preset temperature being sufficiently high that said glass sheet first surface is simultaneously heated by heat radiation and forced air convection, said passage holes being provided with a flared configuration allowing passage of a hot air flow provided by said fan means at a speed that is adjustable so that the hot air flow striking the glass sheet first surface from exits of said passage holes spreads across the first surface to ensure temperature uniformity all over said first glass sheet surface, particularly at the start of the heat treatment; and second convection heating means arranged in said chamber below said plurality of conveyor rollers and along said advancement direction of the glass sheet and provided with a plurality of nozzles arranged in a configuration such that a first portion of the plurality of nozzles distribute hot air over the glass sheet second surface and at least a second portion of the plurality of nozzles force hot air to directly strike corresponding ones of the conveyor rollers for simultaneously heating said glass sheet second surface by forced air convection and cooling said plurality of conveyor rollers to temperatures to prevent greater expansion of the glass sheet second surface than the glass sheet first surface, due to heat transmission contact with the plurality of rollers.

2. A furnace for heat treatment of glass sheets, comprising a chamber containing roller conveyor means and a plurality of conveyor rollers supporting thereon a glass sheet being treated for advancement along an advancement direction, the glass sheet having a first surface and an opposite second surface, the second surface being supported for advancement on and in direct heat transmission contact with the plurality of conveyor rollers, and a heating system for controlling the heating conditions of the glass sheet and uniformly heating the first and second surfaces thereof, the heating system comprising:

combined irradiation and first convection heating means arranged in said chamber above said glass sheet being treated that is supported on the plurality of conveyor rollers, for simultaneously heating by irradiation and by forced air convection the glass sheet first surface, wherein the combined irradiation and first convection heating means comprise radiating panels arranged side by side along said glass sheet advancement direction and having passage holes therein, overlying heating units, and fan means for conveying air heated by said heating units to said passage holes, with each one of said panels being brought to a preset temperature by a corresponding one of said overlying heating units, the preset temperature being sufficiently high so that the panels emit heat radiation directly onto the glass sheet first surface being treated, the passage holes having a flared configuration allowing passage of a hot air flow provided by said fan means at a speed that is adjustable so that the hot air flow that strikes the glass sheet first surface at exits of the passage holes achieves a speed profile effective to ensure temperature uniformity all over the glass sheet first surface, particularly at a starting of the heat treatment; and second convection heating means arranged in said chamber below the roller conveyor means and along said advancement direction of the glass sheets for simultaneously heating by forced air convection the glass sheet second surface and cooling the plurality of conveyor rollers to even out the temperature at the glass sheet second surface relative to that of the glass sheet first surface.

3. The system of claim 2, wherein the air speed is regulated by means for controlling the speed of the fan means which produces the flow of air.

4. The system of claim 2, wherein each of the radiating panels is arranged parallel to the longitudinal direction of advancement of the glass sheet being treated.

5. The system of claim 2, wherein each of the heating units related to the radiating panels is constituted by an electric resistor.

6. The system of claim 5, wherein each of the heating units is provided with a curved reflector panel arranged above each electric resistor.

7. The system of claim 2, comprising ducts provided with the fan means for drawing air from the chamber and for conveying the air towards the heating units, towards the radiating panels and towards the exits of the passage holes.

8. The system of claim 7, wherein each of the exits formed in the radiating panels having a flared portion determines a preset flow-rate profile of outgoing air at the exits.

9. The system of claim 2, wherein the second convection heating means comprises, below the roller conveyor means, and therefore below the glass sheet being treated, a plurality of electrical resistor heating elements which are arranged parallel to the advancement direction, box-like bodies, each of which contains a respective heating element, and a plurality of nozzles protruding from the box-like bodies in order to distribute hot air, which is conveyed into the box-like body and is guided so as to strike, at preset speeds, both the glass sheet being treated and the rollers of the conveyor means.

10. The system of claim 9, wherein each of the plurality of nozzles is constituted by sets of tubes, at least one set of tubes being directed towards the sheet being treated and at least one set of tubes being directed toward a corresponding roller.

* * * * *

UNITED STATES PATENT AND TRADEMARK OFFICE
CERTIFICATE OF CORRECTION

PATENT NO.     : 6,470,711 B1
DATED          : October 29, 2002
INVENTOR(S)    : Jouko Jarvinen et al.

It is certified that error appears in the above-identified patent and that said Letters Patent is hereby corrected as shown below:

<u>Title page,</u>
Item [73], Assignee, should read as follows:

-- IANUA S.P.A.
  Via Leonardo Da Vinci, 1-z.I.
  35042 Este, Italy --

Signed and Sealed this

Twentieth Day of April, 2004

JON W. DUDAS
*Acting Director of the United States Patent and Trademark Office*